Figure 1:
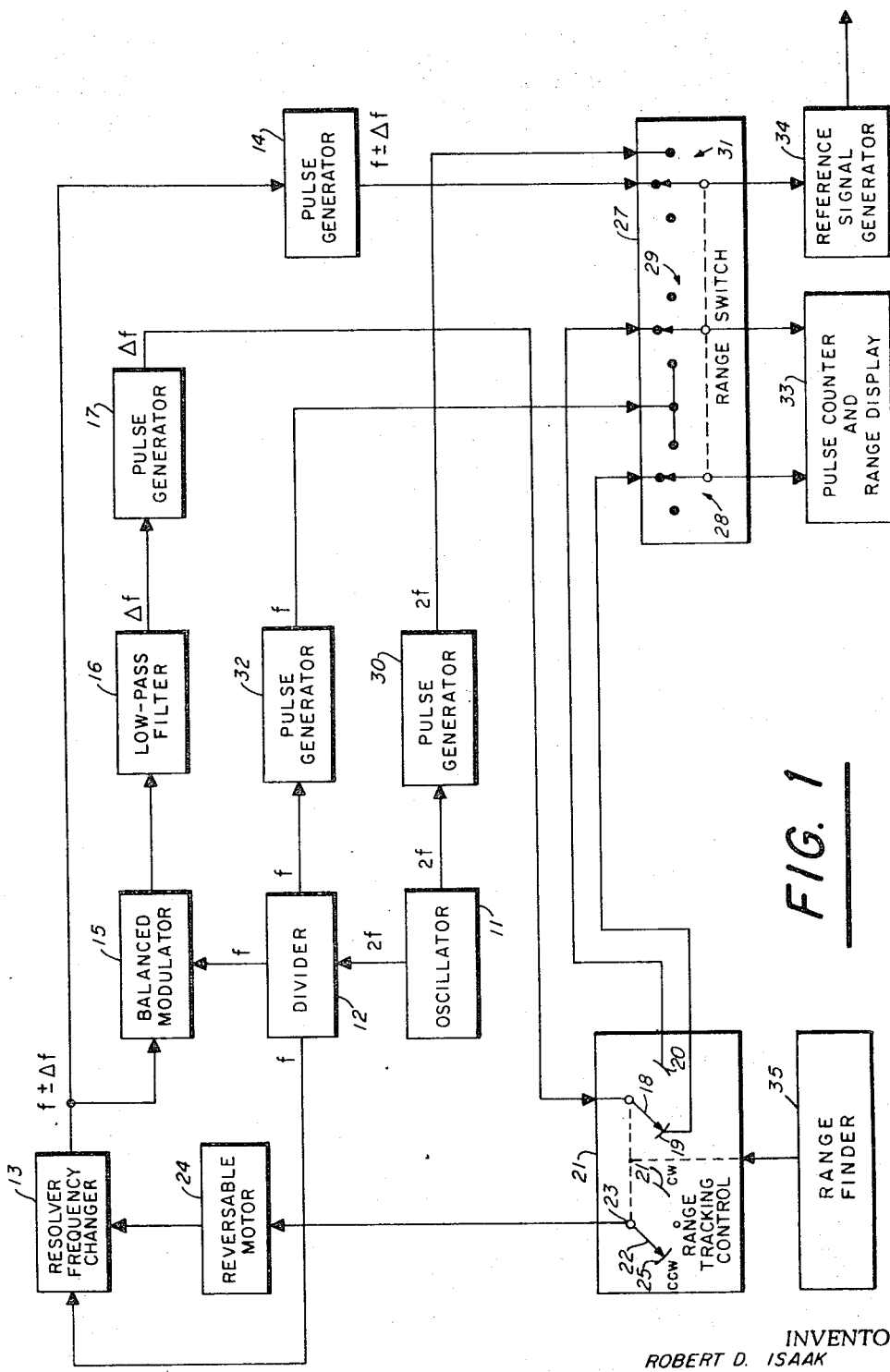

United States Patent

[11] 3,614,780

[72] Inventors Robert D. Isaak;
Woodrow H. Littrell, both of San Diego, Calif.
[21] Appl. No. 157,604
[22] Filed Dec. 6, 1961
[45] Patented Oct. 19, 1971
[73] Assignee The United States of America as represented by the Secretary of the Navy

[54] CRYPTOGRAPHIC COMMUNICATION SYSTEM
6 Claims, No Drawings
[52] U.S. Cl. ........................................................ 343/7 ED, 325/32
[51] Int. Cl. ........................................................ G01s 9/02, H04k 1/00
[50] Field of Search ........................................... 343/12, 100.7, 7.3, 7 ED, 7; 325/32

[56] References Cited
UNITED STATES PATENTS
3,113,291 12/1963 Fiske ............................... 325/32 X
3,555,425 1/1971 Dumaire ........................... 325/32 X Primary Examiner—T. H. Tubbesing
Attorneys—Louis A. Miller, R. N. Carter and Don D. Doty ABSTRACT: The invention as described comprising in combination, means for producing a signal 9 a frequency proportional to the instantaneous rate of change in distance between a pair of vessels, means for converting the frequency of said signal into parameters displayed in terms of instantaneous distance between said pair of vessels, means for generating a predetermined reference signal, and means connected between said frequency signal producing means and said converting and generating means for selectively driving said converting and generating means simultaneously or reversely with respect to each other.

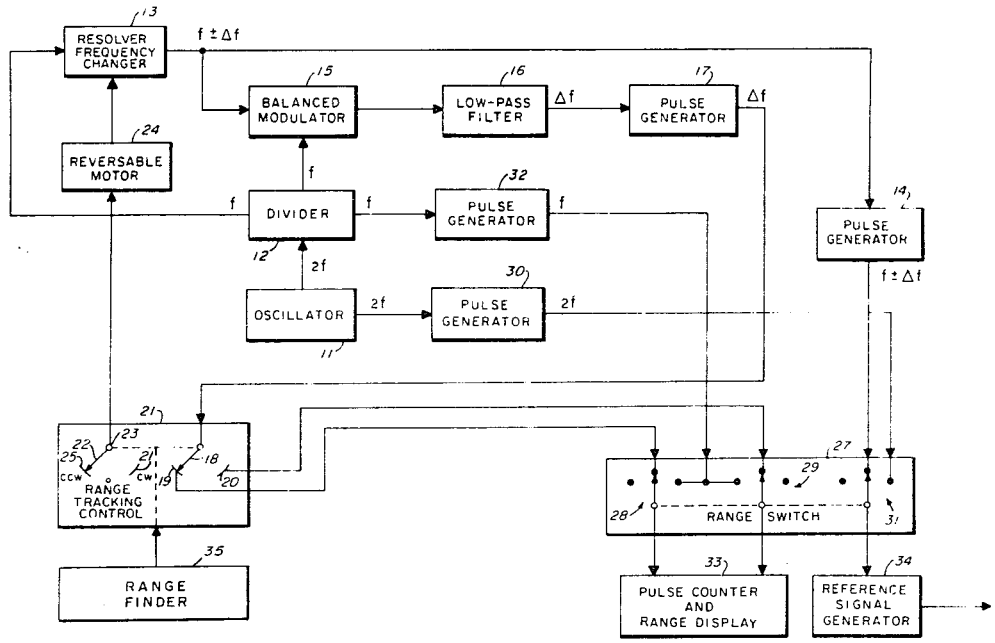

CRYPTOGRAPHIC COMMUNICATION SYSTEM

The invention described herein may be manufactured and used by or for the Government of the United States of America for governmental purposes without the payment of any royalties thereon or therefor.

The present invention relates in general to communication and echo-ranging systems and in particular is a system for both continuously indicating the range between communicating vessels or between a search and target vessel and timely generating an encoded reference signal similar to a signal previously transmitted but delayed therefrom an amount of time proportional to the relative range therebetween.

In the past, it has been exceedingly difficult to generate an encoded reference signal at the proper time so that it may be continuously correlated with a similarly encoded signal originally transmitted for communication or echo-ranging. Whether communication between said vessels or echo-searching for targets is involved, the production of a replica of a transmitted signals, encoded for cryptic reasons, that is delayed sufficiently to compensate for the time factor of the relative range of said vessels, in event they are moving with respect to one another, has been complicated in many instances by ineffective synchronization between the transmitted and reference signals and, consequently, by ineffective correlation between the received and reference signals. Accordingly, optimum comparison thereof for the purpose of obtaining accurate information therefrom has been substantially unobtainable for many practical purposes.

In addition, it has been difficult to track a vessel and continuously display the range thereof in an accurate manner if there is a relative movement between the tracking and the tracked vessels. And to continuously correlate the continuous display of the range of said vessels with the aforementioned reference signal with any degree of accuracy approaching optimum operation, has presented a problem heretofore unsolved satisfactorily by the devices of the prior art. The present invention achieves results which are vastly superior in this respect to that of known devices by manually or automatically adjusting and driving both the range display apparatus and the reference signal generator synchronized therewith in accordance with the range between vessels, as determined by associated range finding equipment such as, for example, sonar sets, radar sets or any other appropriate echo-ranging or range finding systems. The extreme accuracy and simplicity of the operation of the device of this invention, of course, provides the vastly improved performance not obtained previously.

It is, therefore an object of this invention to provide an improved tracking range indicator.

Another object of this invention is to provide a system for improving the accuracy of correlation between relative range of two vessels and a generation of a reference signal encoded for secure communication and search purposes.

Another object of this invention is to provide a method and means of continuously adjusting the output of a reference signal generator to effect improved accuracy of communication and echo-ranging between relatively moving vessels by continuously compensating for the varying distance therebetween.

A further object of this invention is to provide an improved method and means of synchronizing the generation of a reference signal and the display of range at any given instant between relatively moving vessels.

Still another object of this invention is to provide an improved method and means adapted for either manually or automatically simultaneously adjusting range display and reference signal generation in accordance with range parameters produced by associated echo-ranging equipment.

Figure 2:
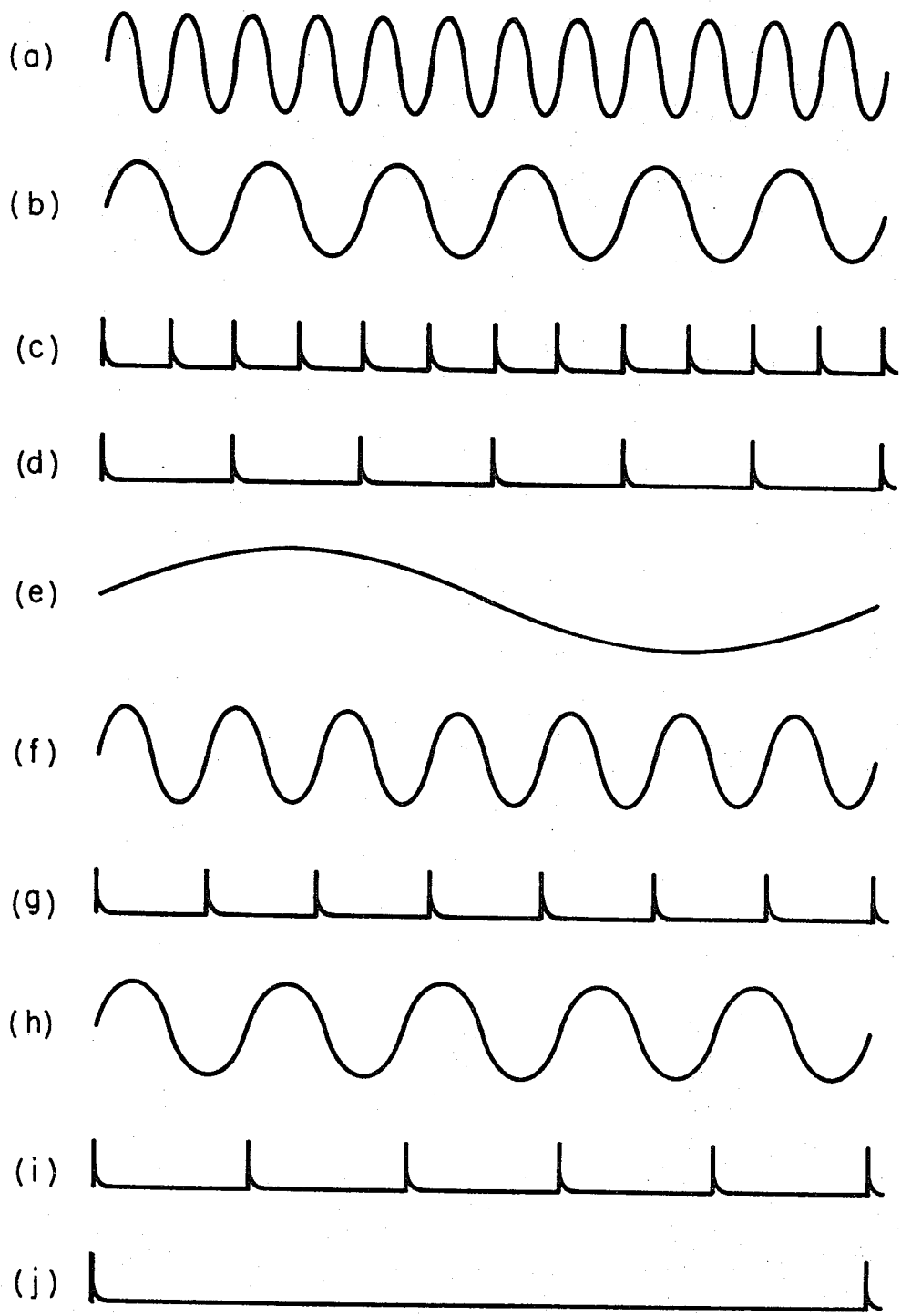

Other objects and many of the attendant advantages of this invention will be readily appreciated as the same becomes better understood by reference to the following detailed description when considered in conjunction with the accompanying drawings wherein:

FIG. 1 is a block diagram of the tracking range indicator and reference signal synchronizer constituting this invention; and FIG. 2 is a graphical representation of exemplary waveforms of the output signals from the various elements of the subject invention.

Referring now to FIG. 1, there is shown an oscillator 11 for producing an output sine wave signal having a frequency of $2f$ cycles per second. Coupled to the output of oscillator 11 is a divider 12 which divides the $2f$ cycle per second output signal thereof by two and thereby produces an output signal having $f$ cycles per second. This $f$ output signal is applied to the input of a resolver frequency changer 13, the output of which is fed to a pulse generator 14. The $f$ output signal from divider 12 is also applied to one of the inputs of a balanced modulator 15, with the other input thereof receiving its signal from the output of resolver frequency changer 13. The output of balanced modulator 15 is coupled through a low-pass filter 16 and a pulse generator 17 to a movable arm 18 adapted for electrical contact with a subtract bus switch contact 19 and an and bus switch contact 20 of a range tracing control 21. Within range tracking control 21 and ganged to movable arm 18 is a movable indicator arm 22 having a manually operable knob 23 that is connected to a reversible motor 24 for speed and direction control thereof as desired. Associated with movable indicator arm 22 are scales 25 and 26 for respectively indicating the direction and speed of rotation, if any, of said reversible motor 24. Scales 25 and 26 may be calibrated to read range rate directly in knots or miles per hour as appropriate and are marked, for example, CCW or RC for range closing and RO or CW for range opening, respectively. Range tracking control 21 is connected to a range switch 27 for the purpose of making gross range changes in such manner that switch contact 19 is coupled to the center contact of a three-contact switch 28 through the subtract bus, and switch contact 20 is coupled to the center contact of another three-contact switch 29 through the add bus.

The $2f$ cycles per second output signal from oscillator 11 is also coupled to the input of the pulse generator 30, the output of which is connected to the right hand contact of a three contact switch 31 also considered a portion of range switch 27.

Likewise, the $f$ cycle per second output signal from divider 12 is coupled to the input of a pulse generator 32, the output of which is, in turn, connected to the right-hand contact of switch 28 and the left-hand contact of switch 29. The output of pulse generator 14 is coupled to the center contact of switch 31.

Switches 28, 29, and 31 of range switch 27 have movable arms which are ganged together for simultaneous mechanical movement thereof with respect to their respective switch contacts.

Connected to the movable arm of switches 28 and 29 of range switch 27 is a reversible pulse counter and range display 33, and connected to the movable arm of switch 31 is a reference signal generator 34 which may be of the pseudorandum noise generator type or any other pertinent pattern-type signal generator having an encoded output used for communication or echo ranging purposes.

The aforesaid range switch 27 should preferably be of the type that is defined in the art as an electronic switch, which enables switching to occur only at those times when input pulses are not being applied thereto. Although under certain circumstances it would be obvious that this switch could be manually operated, in the event a cumulative error cannot be tolerated and would adversely effect the accuracy of operation of the subject invention, the electronic switch should be employed.

As previously mentioned, in the event it is desireable to automatically adjust range tracking control 21, rather than manually adjust it, a range finder 35 may be connected thereto for such purpose.

Briefly, the operation of the subject invention as depicted in FIG. 1 is now described in conjunction with FIG. 2 as follows:

In which employ cross correlation signal processing techniques for communication and/or echo ranging purposes, a reference signal generator is used to generate a coded signal which is an exact replica of the signal that is expected at the receiver. And in order to obtain correlation, the travel time for the original signal to propagate from the transmitter to the receiver must be accurately matched in time by suitably delaying the generation of the reference signal. Thus, it can be seen, that the generation of the reference signal must be delayed a time period that is proportional to the relative range between the communicating vessels or the echo ranging vessel and the target, as the case may be.

In the event there is relative motion between the transmitter and the receiver in the case of communication or if there is relative motion between the transmitter-receiver and the target in the case of echo ranging, it is necessary to drive a reference signal generator at a slightly faster rate to compensate for a closing range and a slightly slower rate to compensate for an opening range in order to maintain correlation. Of course, if the range between communicating vessels or the echo-ranging and target vessels remain constant, the aforesaid reference signal generator need not be driven faster or slower than normal for doppler compensation purposes.

The system of FIG. 1 actually defines a method and means of accurately using the aforementioned time delays in such manner that there is appropriate synchronization between the reference signal generator and the indicator which displays the range between vessels or the length of the propagation path of the originally transmitted signal, as the case may be. For display purposes, it has been found expedient to use a reversible pulse counter calibrated to read directly in range. In a typical example it has also been found to be advantageous to make frequency $f$ equal to two kilocycles per second, with $2f$, of course, then being 4 kilocycles per second, and allowing $\Delta f$ to vary between 0 and 10 cycles per second. Because the motor which drives resolver frequency changer 13 is reversible the $\Delta f$ generated thereby is proportional to either closing range rates or opening range rates and can, therefore, add to or subtract from frequency $f$, respectively, for appropriately driving reference signal generator 34.

Initially, oscillator 11, produces a sine wave output signal similar to that depicted in FIG. 2($a$) and this is divided by two in divider 12 to produce an output sine wave form similar to that illustrated in FIG. 2($b$). This sine wave having $f$ frequency is applied to both resolver frequency changer 13 and balanced modulator 15. As a result of regulating the movable arms of range tracking control 21 by means of knob 23 manually (or automatically by other associated equipment), the speed of reversible motor 24 may be varied up or down and the direction thereof may be controlled in such manner as to cause resolver frequency changer 13 to vary the frequency of the output therefrom from $f+\Delta f$ to $f-\Delta f$, where $\Delta f$ is proportional to the range rate between said vessels. If frequency $\Delta f$ is represented by the waveform of FIG. 2($e$), then the output signal of resolver frequency changer 13 might appear as the waveform of FIG. 2($f$) when the frequency thereof is $f+\Delta f$. Likewise, it might appear as a waveform shown in FIG. 2($h$) in event the frequency thereof is $f-\Delta f$. Obviously, the waveforms shown in FIG. 2 are exemplary only, and, furthermore, it should be understood that the waveform of FIG. 2($f$) and 2($h$) might vary anywhere in between the exemplary frequencies represented thereby. The $f\pm\Delta f$ output signal from resolver frequency changer 13 is applied to pulse generator 14 which produces pulses comparable to, for instance, the pulses of FIGs. 2($g$) and 2($i$), which, of course, actually have the same frequency as the frequency of the input signal to said pulse generator. During normal operation, these output pulses from pulse generator 14 are used to drive reference signal generator 34 at the proper speed for optimum signal matching of the encoded reference signal with the received communication or target echo signal, regardless of the range therebetween.

The outputs of resolver frequency changer 13, in addition to driving reference signal generator 34, is also fed to balanced modulator 15. Because this balance modulator has another input signal of undisturbed frequency $f$, it contains the two sidebands $f+(f\pm\Delta f)$ and $f+(f\pm\Delta f)$. After being filtered in low-pass filter 16, the output thereof becomes the remaining sideband $f-(f\pm\Delta f)$ or just $\pm\Delta f$, the sign of which no longer has any significance. This $\Delta f$ is then converted to pulses similar to those shown in FIG. 2($j$), having frequency of $\Delta f$ pulses per second, to drive via range tracking control 21 and range switch 27 the pulse counter and range display 33 for subtracting or adding range thereto as desired. Thus it can be seen, the displayed range indication can be varied to show a closing range, for example, by moving movable arm 18 to contact 19 and show an opening range by moving movable arm 18 to contact 20 of range tracking control 21. The degree of closing or opening range indications are controlled by the amount of left or right positioning of movable arm 18 with respect to either subtract contact 19 or add contact 20.

Large changes in time delay necessitated by gross range changes are effected by operating range switch 27 in the appropriate direction for an interval of time equal to the propagation time of the transmitted signal or until the range indicator reads the desired range. When the switch is moved to the left, pulse counter and range display 33 is connected to the output of pulse generator 32, so that its count increases at the rate of $f$ cycles per second. At the same time, reference signal generator 34 is not being driven, so that it is effectively being delayed in time relative to any other similar generator associated therewith, but not included as a part of this invention, which is constantly driven at frequency $f$. When range switch 27 is moved to the right, the pulse counter and range display unit 33 has its subtract bus connected to the output of pulse generator 32, so that its count decreases at the rate of $f$. At the same time reference signal generator 34 is being driven at twice the normal rate, that is, at the $2f$ rate, so that it is effectively being advanced in time relative to any other similar generator associated therewith which is constantly driven at frequency $f$.

Range switch 27 is shown in FIG. 1 as a three-pole, three-position switch. As previously mentioned, an electronic switch may be used to perform this function. If such a switch is properly gated with the $f$ pulse generator output of pulse generator 32, there will be no error in counting pulses as a result of switching time. Even though the range error per pulse is trivial, a large number of switching operations over an extended period of time, with no zero resetting, could result in an intolerable cumulative range error if a mechanical switch were employed. Hence, the design choice of electronic or mechanical switch as range switch 27 must depend upon the permissible error in each particular application.

Each of the components comprising the device shown in FIG. 1 are conventional per se and well known in the art. It is their unique interconnection and interactions which produces the new and improved tracking range indicator and reference signal synchronizer constituting this invention.

Obviously, many modifications and variations of the present invention are possible in the light of the above teachings. It is, therefore, to be understood, that within the scope of the appended claims, the subject invention may be practiced otherwise than as specifically described.

What is claimed is:

1. The invention as described comprising in combination, means for producing a signal having a frequency proportional to the instantaneous rate of change in distance between a pair of vessels, means for converting the frequency of said signal into parameters displayed in terms of instantaneous distance between said pair of vessels, means for generating a predetermined reference signal, and means connected between said frequency signal producing means and said converting and generating means for selectively driving said converting and generating means simultaneously or reversely with respect to each other.

2. The invention according to claim 1 wherein said means for converting the frequency of said signal into parameters displayed in terms of instantaneous distance between said pair of vessels comprises a pulse counter and a range readout and display connected thereto.

3. The invention according to claim 1 wherein said means for generating a predetermined reference signal comprises a variable frequency pseudo random noise generator.

4. The invention according to claim 1 wherein said means connected between said frequency signal producing means and said converting and generating means for selectively driving said converting and generating means simultaneously or reversely with respect to each other comprises a range switch.

5. A continuous tracking range indicator comprising in combination, an oscillator, a divider connected to the output of said oscillator, a resolver frequency changer connected to the output of said divider, a range tracking control having a first pair of movable arms and a pair of indicator scales and a pair of electrical contacts adapted for association and contact therewith respectively, means interconnecting each of said first pair of movable arms for mechanically ganging same for simultaneous and equal movement thereof, a reversible variable speed motor connected for driving said resolver frequency changer, means interconnecting said reversible variable speed motor and the aforesaid movable arms for controlling the speed and direction thereof in accordance with the position of said arms, a first pulse generator coupled to the output of said resolver frequency changer, a balanced modulator having a pair of inputs and an output with one of the inputs thereof coupled to the output of said resolver frequency changer, and the other input thereof coupled to the output of said divider, a low-pass filter connected to the output of said balanced modulator, a second pulse generator coupled between the output of said low-pass filter, and the movable arm of said range tracking control adapted for contact with the pair of electrical contacts thereof, a third pulse generator coupled to the output of the aforesaid divider, a fourth pulse generator connected to the output of said oscillator, a range switch having first, second, and third three-pole-three position switches each of which have movable arms ganged for selectively contacting corresponding poles thereof, said electrical contacts of said range tracking control connected to the center poles of said first and second switches respectively, said right-hand pole of said first switch and said left-hand pole of said second switch being interconnected and coupled to the output of said third pulse generator, the output of said first pulse generator connected to the center pole of said third switch, said right hand pole of said third switch being connected to the output of said fourth pulse generator, a pulse counter and range display having an add terminal and a subtract terminal, said subtract terminal being coupled to the movable arm of said first switch, said add terminal being connected to the movable arm of said second switch, and a reference signal generator connected to the movable arm of said third switch.

6. A tracking range indicator comprising in combination, means for producing a signal having a predetermined fundamental frequency, means connected to said predetermined fundamental frequency signal producing means for varying the frequency of the output signal therefrom, means for regulating the amount the frequency of said fundamental frequency signal is varied in accordance with the range rate between a pair of relatively spatially disposed vessels, a signal generator for producing a predetermined reference signal, a pulse counter and range display means, and a range switch interconnecting said fundamental frequency regulating means, said reference signal generator, and the aforesaid pulse counter and range display means.